(12) United States Patent
Xu et al.

(10) Patent No.: US 11,789,845 B2
(45) Date of Patent: Oct. 17, 2023

(54) SOFTWARE OBJECT IDENTIFICATION USING RECORD GENERATING CODE INSERTION

(71) Applicant: International Business Machines Corporation, Armonk, NY (US)

(72) Inventors: Jijiang (George) Xu, Ottawa (CA); Ying Wang, Ottawa (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/502,670

(22) Filed: Oct. 15, 2021

(65) Prior Publication Data

US 2023/0121795 A1 Apr. 20, 2023

(51) Int. Cl.
*G06F 8/40* (2018.01)
*G06F 11/36* (2006.01)

(52) U.S. Cl.
CPC ............ *G06F 11/3636* (2013.01); *G06F 8/40* (2013.01)

(58) Field of Classification Search
CPC ......... G06F 11/3636; G06F 8/40; G06F 8/441
See application file for complete search history.

(56) References Cited

U.S. PATENT DOCUMENTS

| | | | |
|---|---|---|---|
| 7,565,645 B2 * | 7/2009 | Barrs | G06F 9/5016 707/999.203 |
| 7,624,381 B1 * | 11/2009 | Czajkowski | G06F 11/3644 717/130 |
| 8,775,769 B2 | 7/2014 | Li et al. | |
| 10,108,475 B2 | 10/2018 | Chikabelapur et al. | |
| 10,204,000 B2 | 2/2019 | Takamiya | |
| 2006/0200806 A1 * | 9/2006 | Tasinga | G06F 11/3636 717/128 |
| 2007/0027942 A1 * | 2/2007 | Trotter | G06F 11/0751 |
| 2009/0064088 A1 * | 3/2009 | Barcia | G06F 11/3604 717/102 |

FOREIGN PATENT DOCUMENTS

CN 112100022 A 12/2020

* cited by examiner

*Primary Examiner* — Hanh Thi-Minh Bui
(74) *Attorney, Agent, or Firm* — Garg Law Firm, PLLC; Rakesh Garg; Michael O'Keefe

(57) ABSTRACT

Using a code transformation tool, a portion of executable code is inserted into existing executable code, the existing executable code comprising an existing constructor of a class, the existing constructor, when executed, instantiating an object of the class. During execution of the existing constructor, execution of the portion is caused to occur, the execution generating a record, the record comprising execution tracing data of the object.

15 Claims, 8 Drawing Sheets

SOFTWARE OBJECT IDENTIFICATION USING RECORD GENERATING CODE INSERTION

BACKGROUND

The present invention relates generally to a method, system, and computer program product for software object identification. More particularly, the present invention relates to a method, system, and computer program product for software object execution identification using record generating code insertion.

In object-oriented programming languages such as Java, a class is a template, or blueprint, for creating one or more software objects, or simply objects. (Java is a registered trademark of Oracle Corporation in the United States and other countries.) Thus, an object is an instance of a class. A class includes one or more constructors. A constructor is a method, or function, that instantiates an object of a class. A class often includes more than one constructor, with each constructor instantiating a different object of that class. For example, a class might include constructors that accommodate different numbers and types of calling parameters.

A memory leak occurs when memory is allocated from a system's pool of memory, or heap, but not freed when no longer needed. Because the system's memory pool is not unlimited, as an operating system or language runtime environment executes, memory leaks cause the memory pool to be depleted over time, which can cause execution slowdowns and errors when processes are no longer able to allocate the memory they need to function. To guard against memory leak related memory exhaustion, an operating system or language runtime typically includes software called a garbage collector, which attempts to reclaim allocated memory which is no longer being referenced. However, garbage collection is often configured to execute with lower priority than other executing applications, and in a busy system with too many memory leaks, the garbage collector can fail to keep up, causing slowdowns and errors.

A call stack is a data structure that stores information about the active methods, functions, or subroutines of a computer program. A call stack records the address to which each active method should return control when the method finishes executing. A call stack typically also stores data related to method execution, such as calling and return parameters of a method. Thus, a call stack is an example of a record including execution tracing data of a set of methods.

SUMMARY

The illustrative embodiments provide a method, system, and computer program product. An embodiment includes a method that inserts, using a code transformation tool, a portion of executable code into existing executable code, the existing executable code comprising an existing constructor of a class, the existing constructor, when executed, instantiating an object of the class. An embodiment causes, during execution of the existing constructor, execution of the portion, the execution generating a record, the record comprising execution tracing data of the object.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
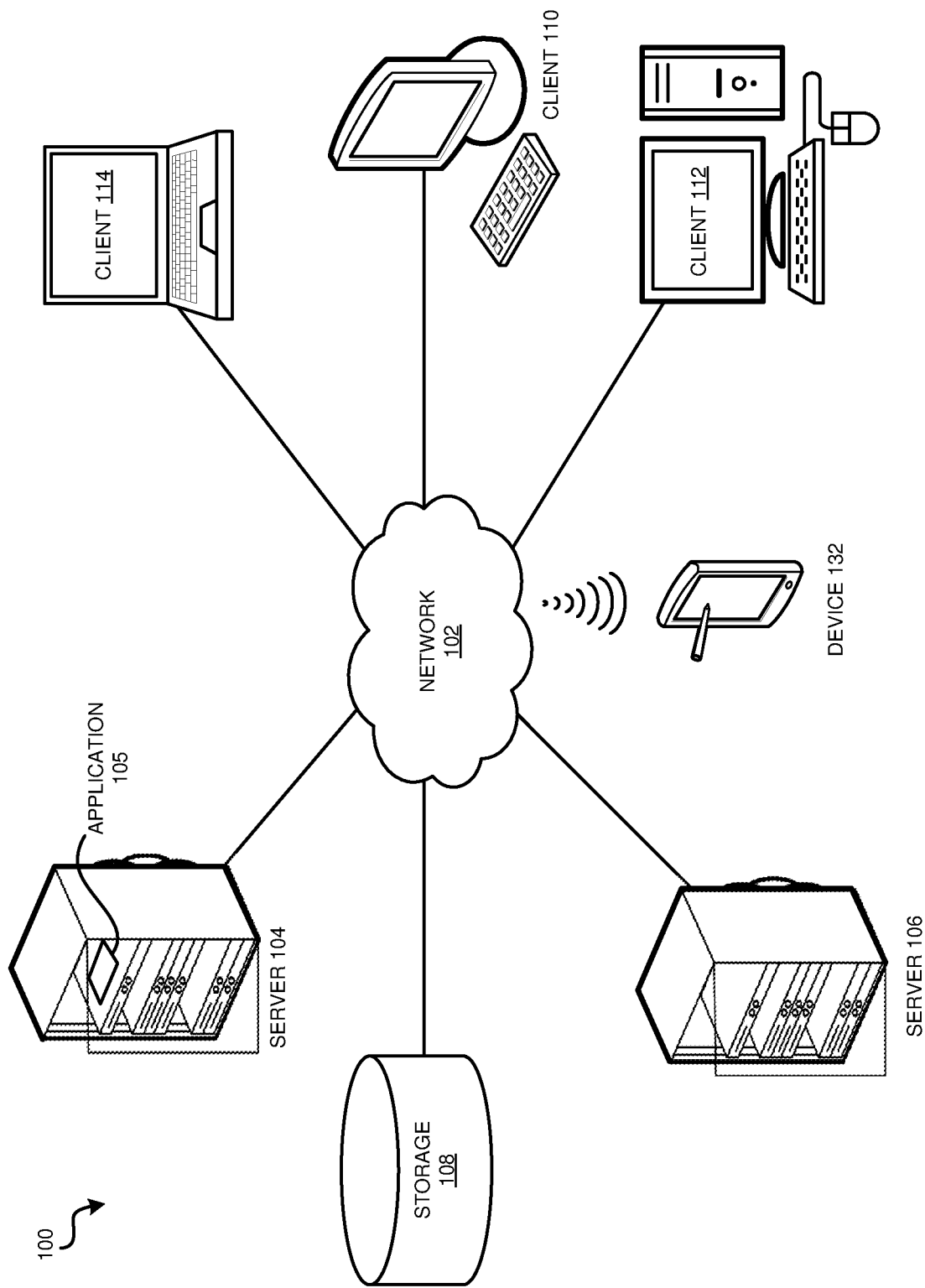
FIG. 1 depicts a block diagram of a network of data processing systems in which illustrative embodiments may be implemented.

The illustrative embodiments recognize that one method of resolving a memory leak is to determine which method, in which execution thread, allocated memory to an object and did not free the allocated memory. However, some classes are used by many components and services. As a result, while one memory analysis tool can list objects that have been marked as ready for garbage collection within an executing operating system or runtime environment, code calling an object in the list might be in one of hundreds of call stacks. A human analyst would need to examine each call stack to determine the source of a particular memory leak. In addition, a thread that allocated an object might have completed execution and had its call stack removed, rendering the source of a particular memory leak untraceable. Another software analysis tool monitors execution of existing application code and records call stack data when an object is instantiated. However, monitoring execution and generating and storing the tracing data produces an unacceptable performance impact. In addition, the resulting data includes all of the call stacks containing the object, and a human analyst would need to examine each call stack to help determine the source of the leak. Execution records other than call stacks are subject to the same problems.

The illustrative embodiments also recognize that another method of resolving a memory leak is to insert additional source code into suspected classes or execution paths of an application, to generate output with which to trace an execution path. However, a human analyst is unlikely to have access to the source code of the application, and even if available a human analyst is unlikely to be familiar enough with the application to insert the additional source code into a location that provides useful results.

Thus, the illustrative embodiments recognize that there is an unmet need to improve memory leak identification, in particular by identifying an execution record, such as a call stack, of a particular allocated object that was not properly freed, without requiring human access to source code.

The illustrative embodiments recognize that the presently available tools or solutions do not address these needs or provide adequate solutions for these needs. The illustrative embodiments used to describe the invention generally address and solve the above-described problems and other problems related to software object execution identification using record generating code insertion.

An embodiment can be implemented as a software application. The application implementing an embodiment can be configured as a modification of an existing software analysis system, as a separate application that operates in conjunction with an existing software analysis system, a standalone application, or some combination thereof.

Particularly, some illustrative embodiments provide a method that inserts, using a code transformation tool, a portion of executable code into existing executable code and causes, during execution of the existing constructor, execution of the portion.

An embodiment uses a code transformation tool to insert a portion of executable code into existing executable code. One non-limiting example of a presently available code transformation tool is the ClassFileTransformer interface implemented in some versions of Java, which a runtime agent can use to transform existing Java code into different Java code. Thus, an embodiment implemented to analyze Java code provides the agent with a list of one or more classes to modify and the code to be inserted into the classes, and the agent uses the ClassFileTransformer interface to insert the provided code into the listed classes. Other code transformation tools are available for other software languages. For example, some implementations of other software languages support aspect oriented programming, a programming technique that supports adding additional behavior to existing code without modifying the code itself. Instead a specification specifies which code is to be modified and what the modifications are.

In one embodiment, the existing executable code is a constructor, a method that instantiates an object of a class. In another embodiment, the existing code is not a constructor, but instead is code that is executed during object execution. However, executing additional, inserted, code during object execution could have a performance impact on the existing code or an executing application using the code, while inserting additional code into a constructor is unlikely to affect performance. In one embodiment, the inserted portion of executed code is a method that, when called, generates a record of execution tracing data of the instantiated object. In one embodiment, the method is a private method, which cannot be called from outside the class and its objects. In one embodiment, the record is a data structure that is private, thus inaccessible outside the class and its objects. In one embodiment, the record includes the current call stack when the object is instantiated. In another embodiment, the record includes both the current call stack and an exception object including additional data. Other records, including other data of an object or the execution environment of the object, are also possible and contemplated within the scope of the illustrative embodiments. In addition, the inserted code need not be within a method.

Once the portion has been inserted, an embodiment causes execution of the inserted portion when the code in which it was inserted is executed. Thus, if the portion was inserted into a constructor, the portion is executed when the constructor is executed to instantiate an object. If the portion was inserted into non-constructor code, the portion is executed when that non-constructor code is executed.

Once the inserted portion has been executed and the executing tracing data generated, a user can use a memory analyzer or other tool to examine the generated tracing data. For example, a tool is presently available to examine the contents of a recorded call stack and determine an object corresponding to each address. The result is a decoded call stack including objects that called a memory leaking object, facilitating debugging of the memory leak.

The manner of software object execution identification using record generating code insertion described herein is unavailable in the presently available methods in the technological field of endeavor pertaining to software execution analysis. A method of an embodiment described herein, when implemented to execute on a device or data processing system, comprises substantial advancement of the functionality of that device or data processing system in inserting, using a code transformation tool, a portion of executable code into existing executable code and causing, during execution of the existing constructor, execution of the portion.

The illustrative embodiments are described with respect to certain types of classes, objects, runtime agents, tools, portions of executable code, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
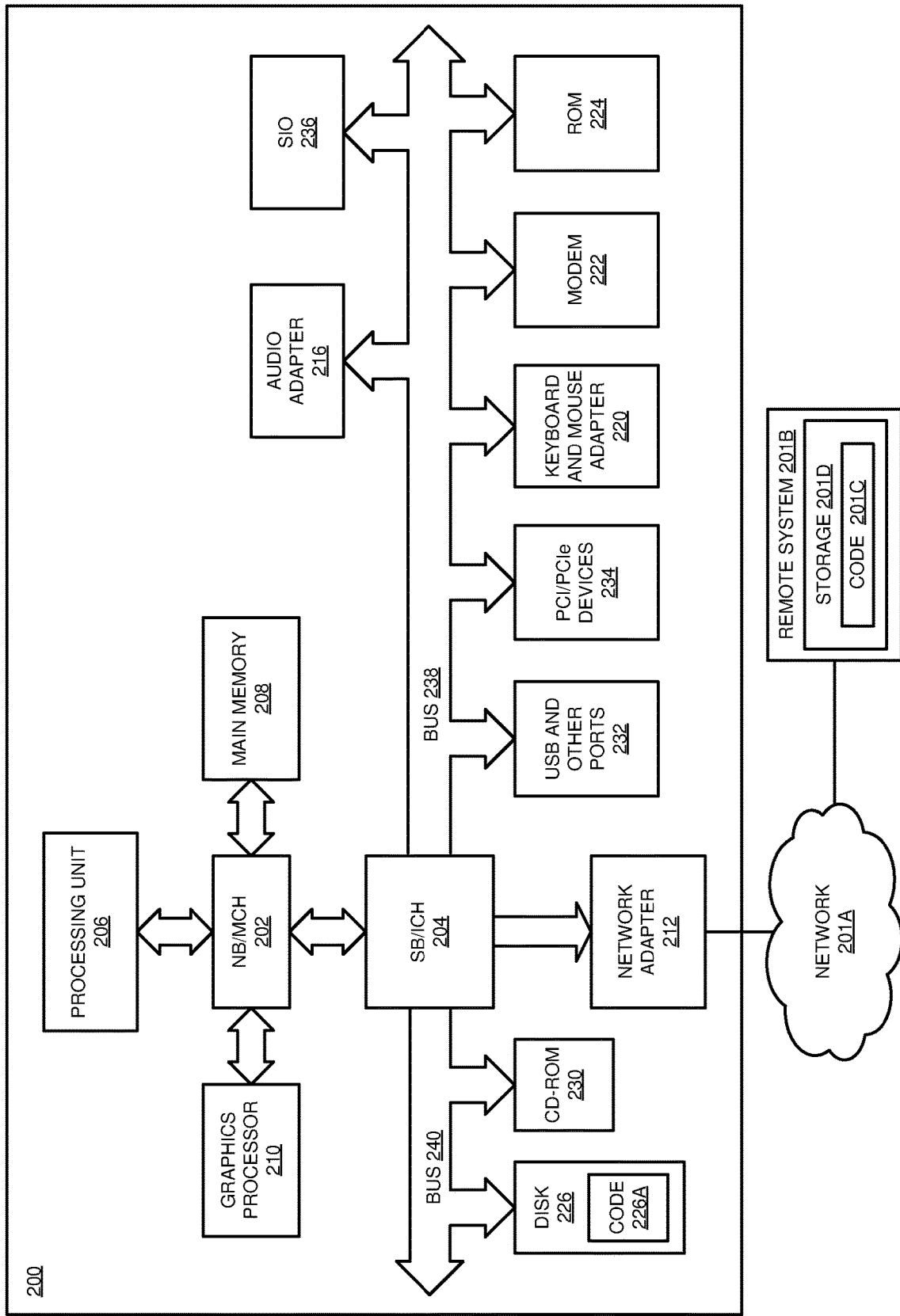
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro- SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
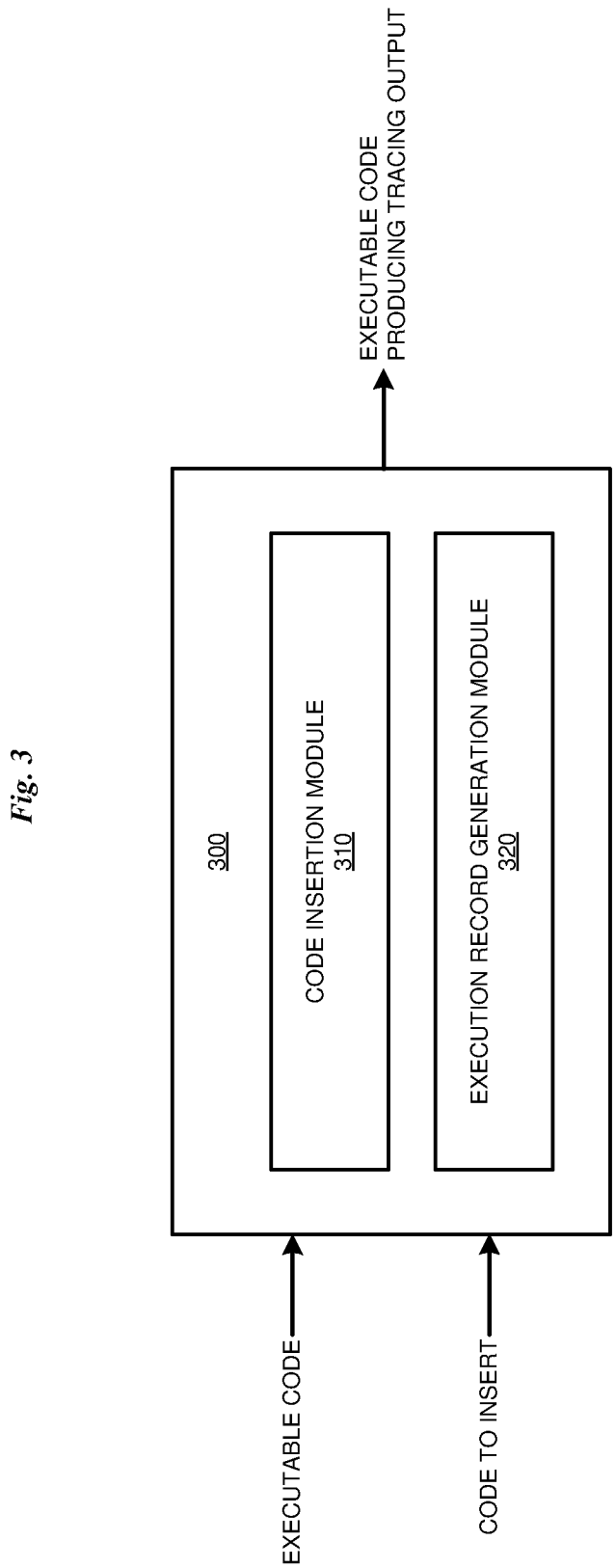
FIG. 3 depicts a block diagram of an example configuration for software object execution identification using record generating code insertion in accordance with an illustrative embodiment.

With reference to FIG. 3, this figure depicts a block diagram of an example configuration for software object execution identification using record generating code insertion in accordance with an illustrative embodiment. Application 300 is an example of application 105 in FIG. 1 and executes in any of servers 104 and 106, clients 110, 112, and 114, and device 132 in FIG. 1.

Code insertion module 310 uses a code transformation tool to insert a portion of executable code into existing executable code. In one implementation of module 310 implemented to analyze Java code, module 310 provides an agent with a list of one or more classes to modify and the code to be inserted into the classes, and the agent uses the ClassFileTransformer interface to insert the provided code into the listed classes.

In one implementation of module 310, the existing executable code is a constructor. In another implementation of module 310, the existing code is not a constructor, but instead is code that is executed during object execution. In one implementation of module 310, the inserted portion of executed code is a method that, when called, generates a record of execution tracing data of the instantiated object. In one implementation of module 310, the record is a data structure that is private, thus inaccessible outside the class and its objects. In one implementation of module 310, the record includes the current call stack when the object is instantiated. In one implementation of module 310, the record includes the current call stack when the object is instantiated. In another implementation of module 310, the record includes both the current call stack and an exception object including additional data.

Once the portion has been inserted, execution record generation module 320 causes execution of the inserted portion when the code in which it was inserted is executed. Thus, if the portion was inserted into a constructor, the portion is executed when the constructor is executed to instantiate an object. If the portion was inserted into non-constructor code, the portion is executed when that non-constructor code is executed.

Figure 4:
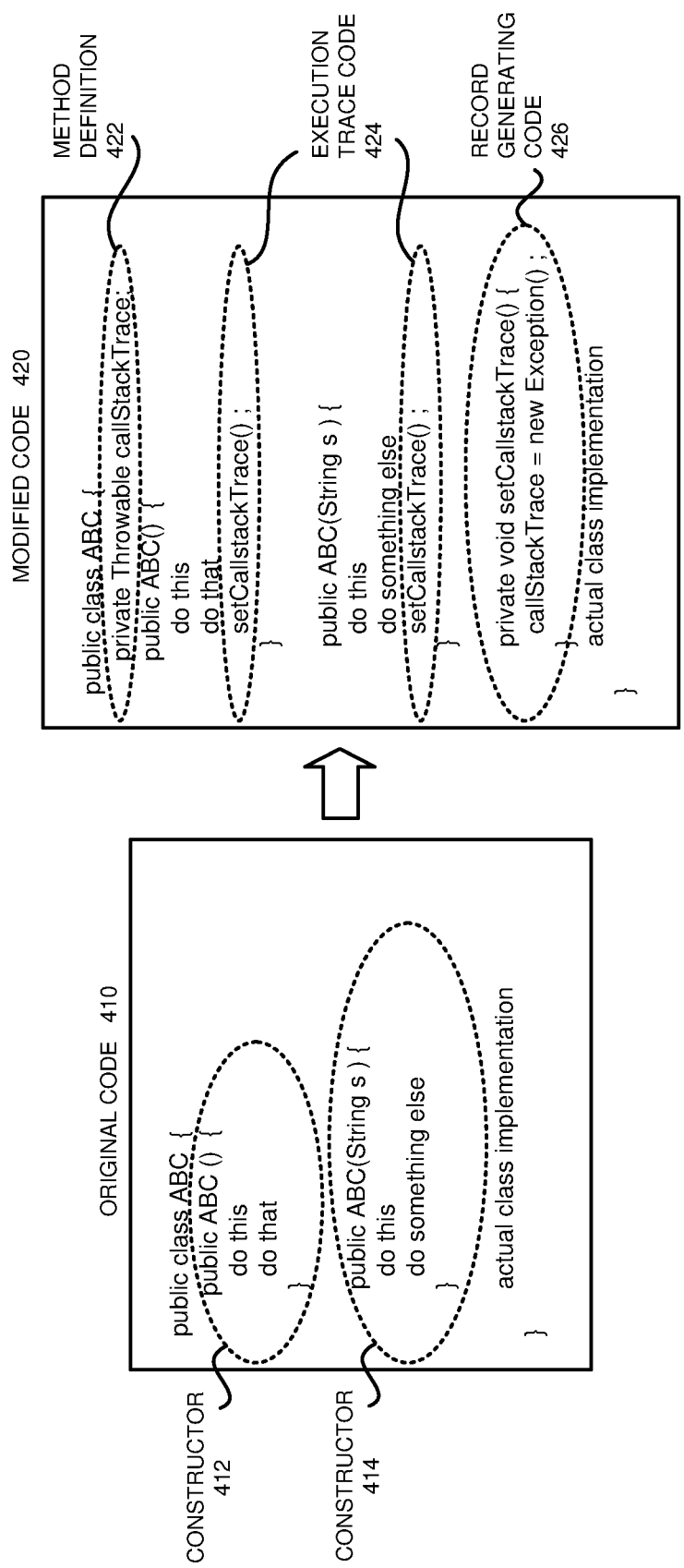
FIG. 4 depicts an example of software object execution identification using record generating code insertion in accordance with an illustrative embodiment.

With reference to FIG. 4, this figure depicts an example of software object execution identification using record generating code insertion in accordance with an illustrative embodiment. The example can be executed using application 300 in FIG. 3.

Original code 410 is pseudocode that includes constructors 412 and 414 of class ABC. Both constructors 412 and 414 instantiate instances of the ABC object; constructor 412 instantiates an instance of the ABC object with no input arguments, and constructor 414 instantiates an instance of the ABC object with a string as an input argument.

Modified code 420 depicts the pseudocode of original code 410, with additional executed coded inserted. In particular, constructors 412 and 414 each include execution trace code 424, a method call to the setCallstackTrace( ) method. Method definition 422 defines the setCallstack-Trace( ) method, so that the constructors can call the method. Record generating code 426 includes code of the setCall-stackTrace( ) method, which calls a method called Exception( ) that stores the current call stack in data of the ABC object. Thus, when either of constructors 412 or 414 is called to instantiate object ABC, the constructor calls the setCall-stackTrace( ) method, generating a record of the current call stack.

Figure 5:
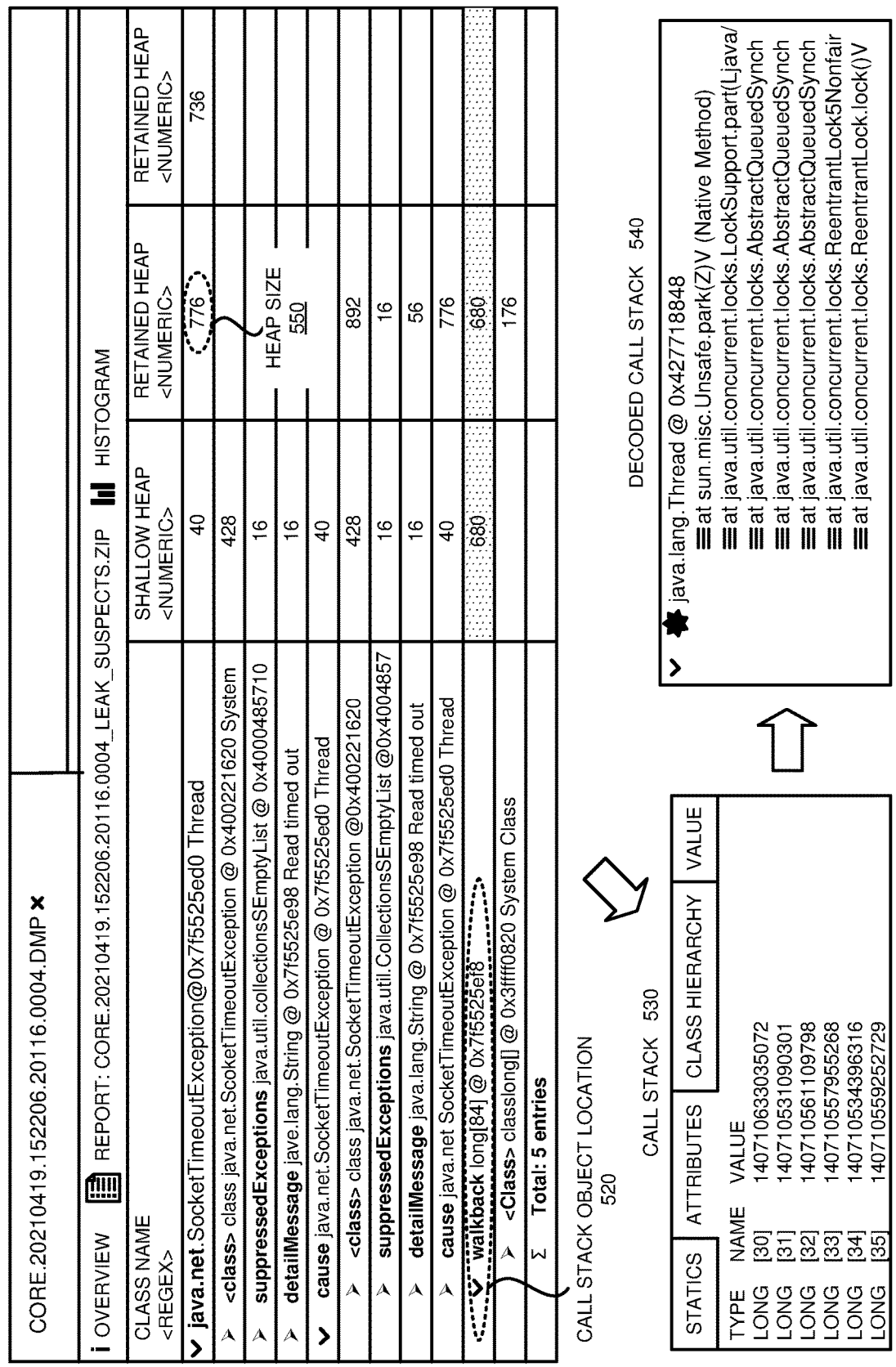
FIG. 5 depicts a continued example of software object execution identification using record generating code insertion in accordance with an illustrative embodiment.

With reference to FIG. 5, this figure depicts a continued example of software object execution identification using record generating code insertion in accordance with an illustrative embodiment.

In particular, FIG. 5 depicts analysis of the record generating by executing the example pseudocode depicted in modified code 420 of FIG. 4. Trace output 510 depicts an example of execution tracing and memory analysis, include heap size 550 and call stack object location 520. Call stack 530 depicts data at call stack object location 520, in which the values depicted are data of the call stack, including example addresses of executable code. An analysis tool has been used to examine the contents call stack 530 and determine an object corresponding to each address. The result is decoded call stack 540, including objects that called a memory leaking object, facilitating debugging of the memory leak.

Figure 6:
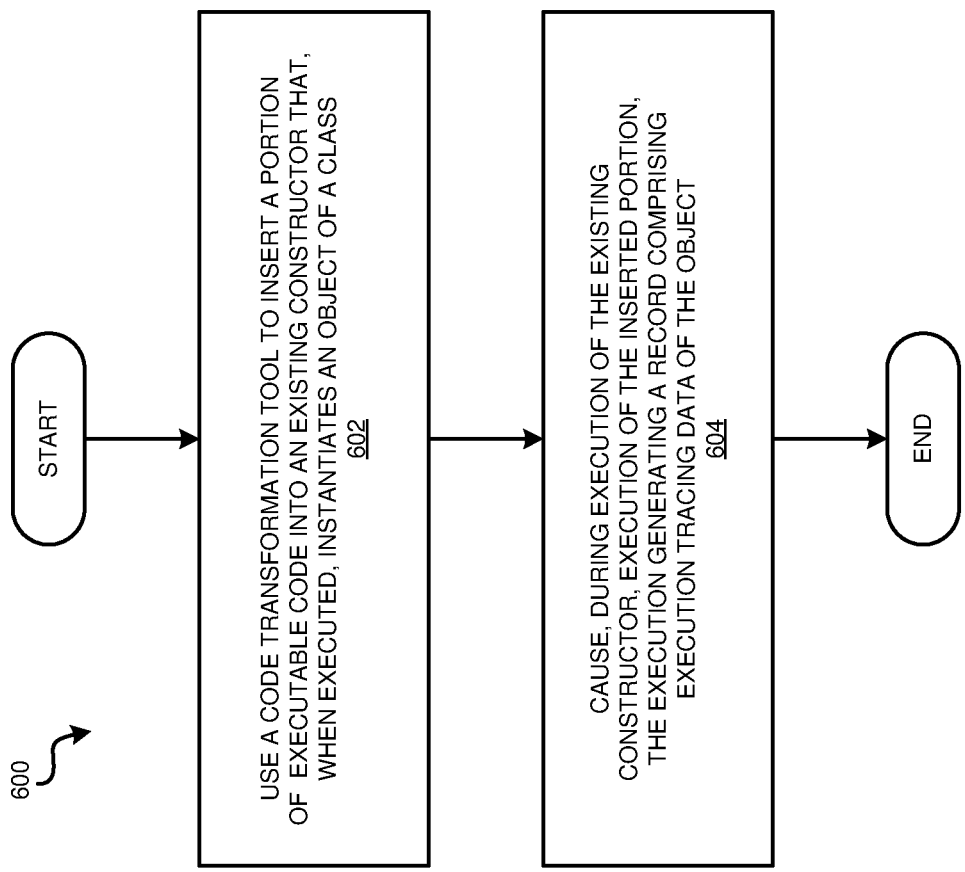
FIG. 6 depicts a flowchart of an example process for software object execution identification using record generating code insertion in accordance with an illustrative embodiment.

With reference to FIG. 6, this figure depicts a flowchart of an example process for software object execution identification using record generating code insertion in accordance with an illustrative embodiment. Process 600 can be implemented in application 300 in FIG. 3.

In block 602, the application uses a code transformation tool to insert a portion of executable code into an existing constructor that, when executed, instantiates an object of a class. In block 604, the application causes, during execution of the existing constructor, execution of the inserted portion, the execution generating a record comprising execution tracing data of the object. Then the application ends.

Figure 7:
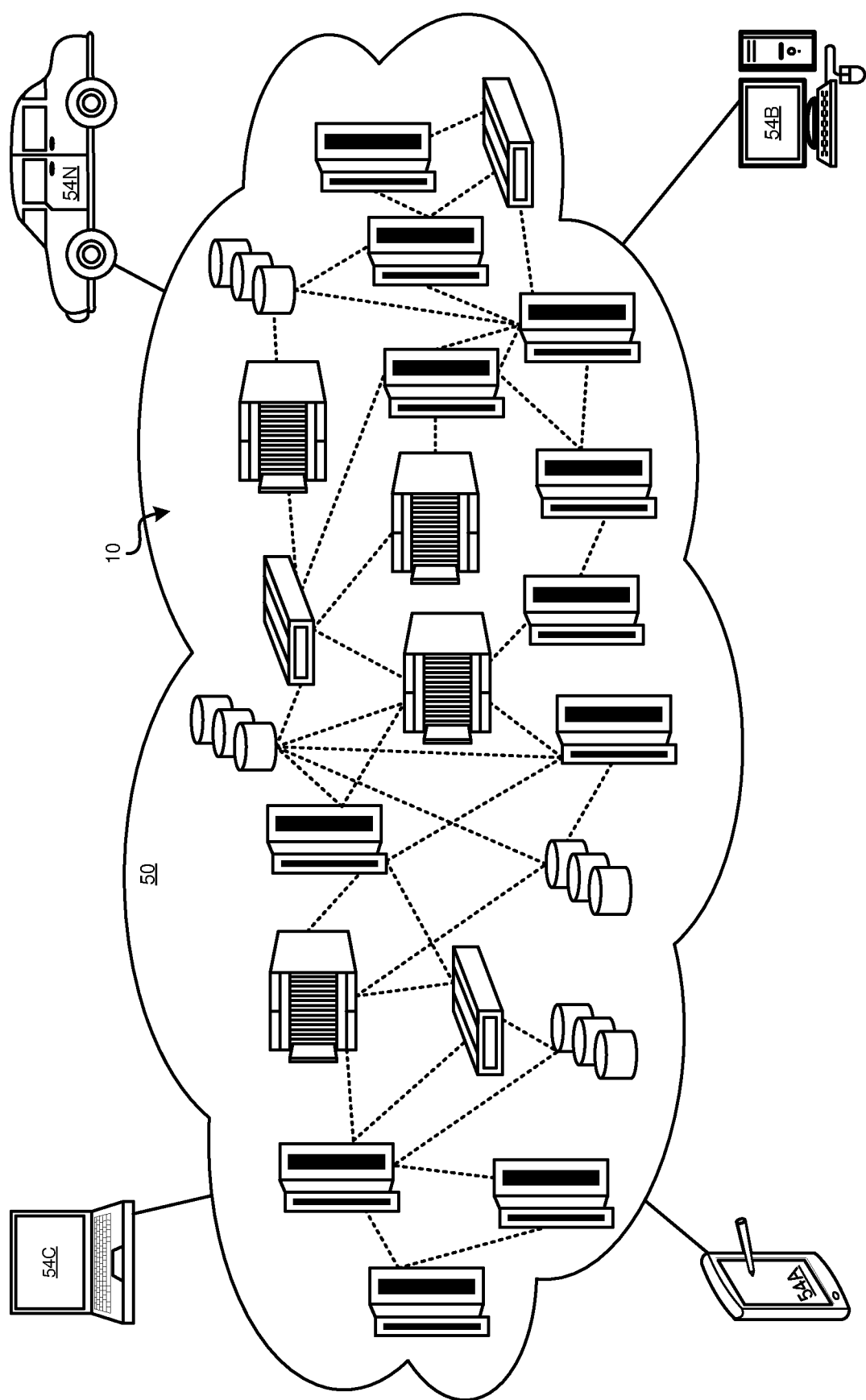
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 8:
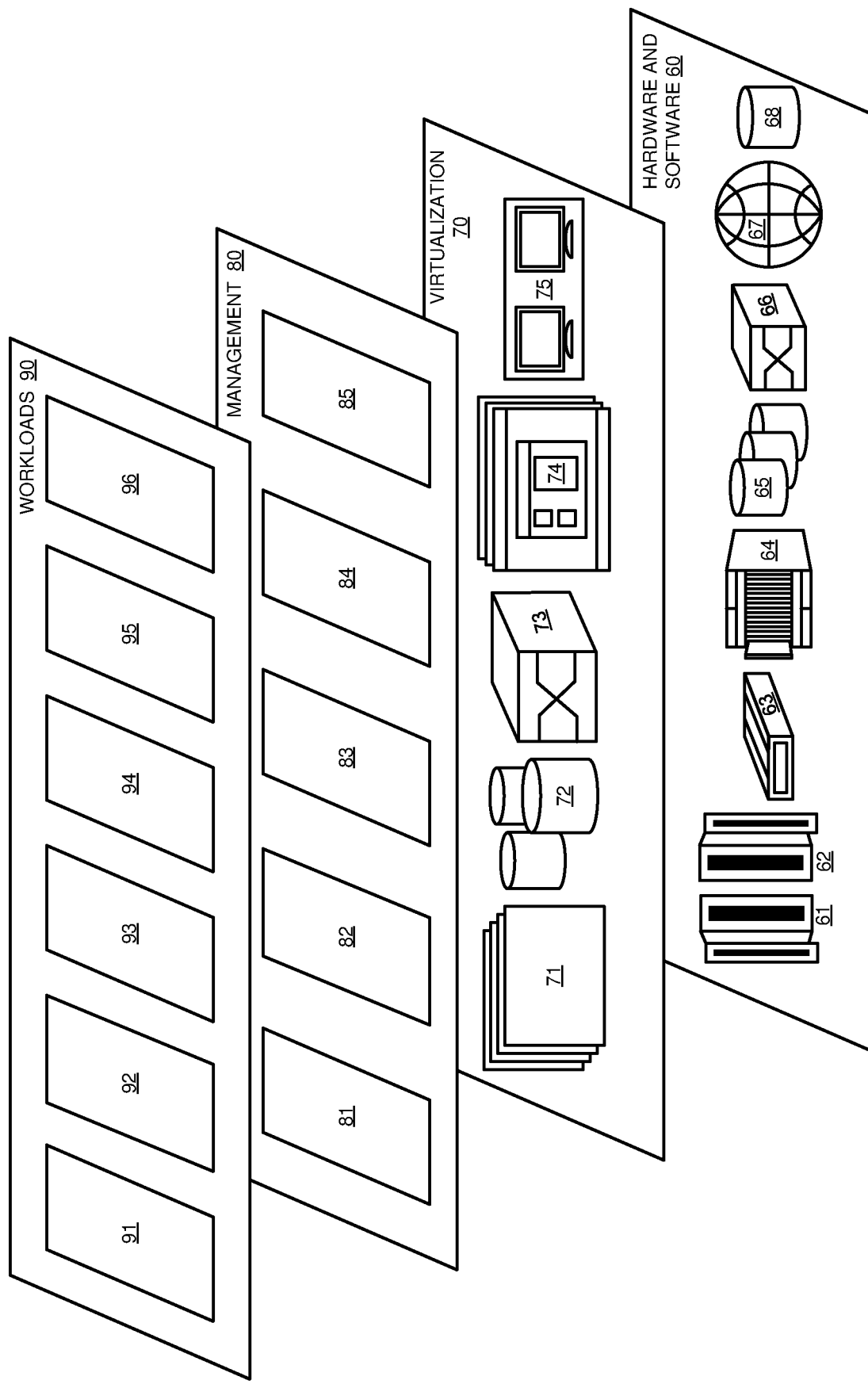
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for software object execution identification using record generating code insertion and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
inserting, using a code transformation tool, a portion of executable code into an existing constructor of a class, the existing constructor comprising existing executable code that, when executed, instantiates an object of the class;
causing, during execution of the existing constructor, execution of the portion, the execution generating a record, the record comprising execution tracing data of the object, wherein the portion comprises a private method that, when called, generates the record, the private method inaccessible from outside the class; and
using the record to identify a memory leaking object.

2. The computer-implemented method of claim 1, wherein the record is private to the class.

3. The computer-implemented method of claim 1, wherein the record comprises a call stack of the object.

4. The computer-implemented method of claim 3, wherein the record further comprises data of the object.

5. A computer program product for software object execution identification, the computer program product comprising:
one or more computer readable storage media, and program instructions collectively stored on the one or more computer readable storage media, the stored program instructions comprising:
program instructions to insert, using a code transformation tool, a portion of executable code into an existing constructor of a class, the existing constructor comprising existing executable code that, when executed, instantiates an object of the class;
program instructions to cause, during execution of the existing constructor, execution of the portion, the execution generating a record, the record comprising execution tracing data of the object, wherein the portion comprises a private method that, when called, generates the record, the private method inaccessible from outside the class; and
using the record to identify a memory leaking object.

6. The computer program product of claim 5, wherein the record is private to the class.

7. The computer program product of claim 5, wherein the record comprises a call stack of the object.

8. The computer program product of claim 7, wherein the record further comprises data of the object.

9. The computer program product of claim 5, wherein the stored program instructions are stored in the at least one of the one or more storage media of a local data processing system, and wherein the stored program instructions are transferred over a network from a remote data processing system.

10. The computer program product of claim 5, wherein the stored program instructions are stored in the at least one of the one or more storage media of a server data processing system, and wherein the stored program instructions are downloaded over a network to a remote data processing system for use in a computer readable storage device associated with the remote data processing system.

11. The computer program product of claim 5, wherein the computer program product is provided as a service in a cloud environment.

12. A computer system comprising one or more processors, one or more computer-readable memories, and one or more computer-readable storage media, and program instructions stored on at least one of the one or more storage media for execution by at least one of the one or more processors via at least one of the one or more memories, the stored program instructions comprising:
program instructions to insert, using a code transformation tool, a portion of executable code into an existing constructor of a class, the existing constructor comprising existing executable code that, when executed, instantiates an object of the class;
program instructions to cause, during execution of the existing constructor, execution of the portion, the execution generating a record, the record comprising execution tracing data of the object, wherein the portion comprises a private method that, when called, generates the record, the private method inaccessible from outside the class; and
using the record to identify a memory leaking object.

13. The computer system of claim 12, wherein the record is private to the class.

14. The computer system of claim 12, wherein the record comprises a call stack of the object.

15. The computer system of claim 14, wherein the record further comprises data of the object.

* * * * *